(No Model.)
G. T. WARWICK.
BALL BEARING FOR VELOCIPEDES.
No. 399,456. Patented Mar. 12, 1889.
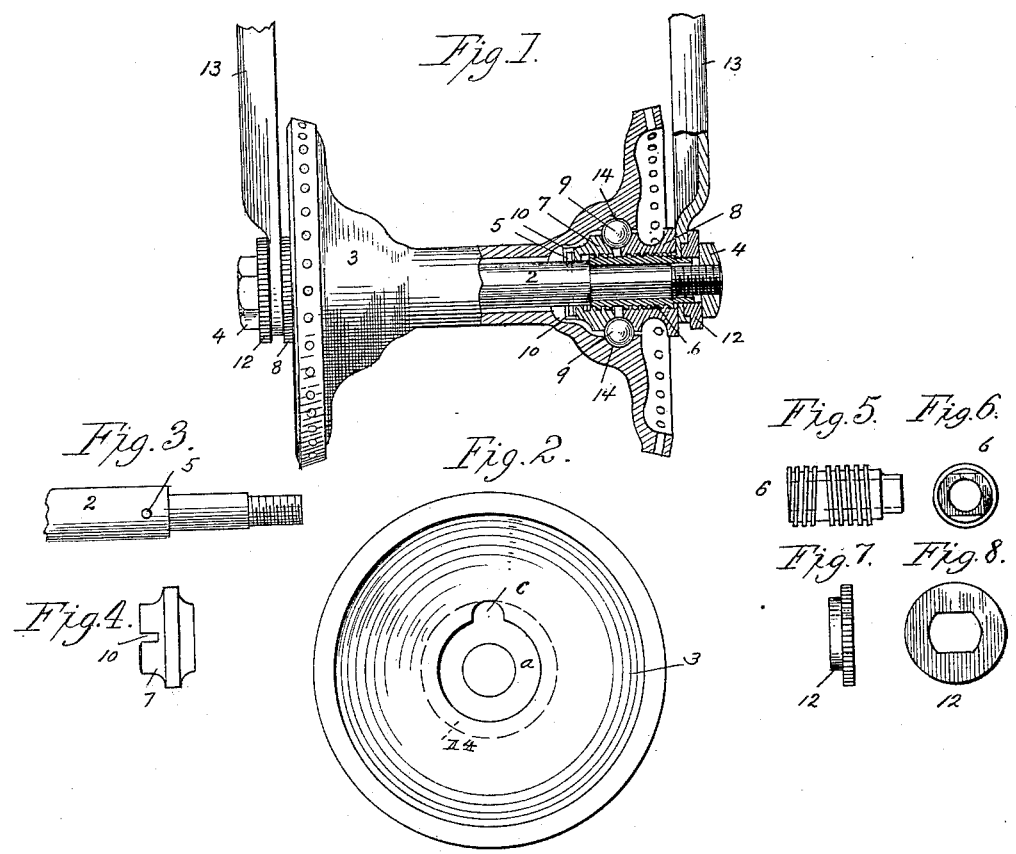
Witnesses,
Wm. F. Bellows
G. M. Chamberlain
Inventor,
Geo. T. Warwick,
By his Attorneys, Chapin &c.

UNITED STATES PATENT OFFICE.

GEORGE T. WARWICK, OF SPRINGFIELD, MASSACHUSETTS.

BALL-BEARING FOR VELOCIPEDES.

SPECIFICATION forming part of Letters Patent No. 399,456, dated March 12, 1889.

Application filed September 3, 1888. Serial No. 284,440. (No model.)

*To all whom it may concern:*

Be it known that I, GEORGE T. WARWICK, a citizen of Great Britain, residing at Springfield, in the county of Hampden and State of Massachusetts, have invented new and useful Improvements in Ball-Bearings for Bicycles and Analogous Vehicles, of which the following is a specification.

This invention relates to bicycles, velocipedes, and analogous vehicles, and pertains particularly to improvements in ball-bearings for the rear or other wheel or wheels of said vehicles, the object being to provide ball-bearings therefor having improved adjustable features, whereby the wear of parts upon which the balls rotate is easily taken up and the bearings are kept in proper working condition; and the invention consists in the peculiar construction and arrangement of the several parts of said bearings, all as hereinafter fully described, and pointed out in the claims.

In the drawings forming part of this specification, Figure 1 is a side elevation, partly in section, of the rear wheel-hub, the axle, a portion of the rear-wheel forks, and of ball-bearing devices constructed according to my invention applied thereto. Fig. 2 is an elevation of one end of the wheel-hub. Fig. 3 is a plan view of one end of the axle. Fig. 4 is an edge view of the axle-nut. Fig. 5 is a plan view of a bearing-adjusting sleeve, and Fig. 6 is an end view of said sleeve. Fig. 7 is an edge view, and Fig. 8 a plan view, of a turning washer fitting on the end of said sleeve.

In the drawings, 2 is the axle, and 3 the rear wheel-hub, having the usual rotary motion on said axle. The spokes and other parts of the rear wheel are not shown in the drawings, but the usual spoke-holes are shown in the ends of said hub.

The axle 2 has its end screwed, as shown, to receive thereon the locking-nut 4, and that portion thereof just back of its screw-threaded end has a slightly-larger diameter than the latter, and a pin, 5, having one end projecting beyond the surface of the axle, is fixed in one or in opposite sides thereof, as shown in Figs. 1 and 3, each end of said axle being prepared, as above described, for the reception of other parts, below mentioned. A ball-bearing adjusting-sleeve, 6, exteriorly screw-threaded and, preferably, with a right and left screw, is fitted onto that portion of the end of the axle 2 just back of its screw-threaded end, and is free to be turned thereon for adjusting the ball-bearing parts, said sleeve extending somewhat over the screw-threaded part of the end of the axle, as shown in Fig. 1.

The ball-bearing parts of the device, which are connected to the end of the axle, consist of two bearing-collars, 7 and 8, the latter being the outer and the former the inner one, as shown, said collars being interiorly screw-threaded and placed upon the said adjusting-sleeve 6, whereby they are held or carried in a slightly-separated position normally, as shown in Fig. 1, and between their adjacent separated ends is formed an annular groove to receive a series of bearing-balls, 9. The inner one of said bearing-collars, 7, has one or more slots, 10, formed in its rear border, with which the aforesaid pin or pins 5 in the axle engage, whereby said collar is prevented from turning on the axle by the rolling action of said balls thereagainst; but the said slot or slots in said collar are of sufficient length to permit it to have a certain degree of longitudinal movement on the axle for adjustment relative to the adjacent end of the outer collar, 8. The latter-named collar is held rigidly in position after the adjustment of the two bearing-collars by the locking-nut 4, which screws on the outer end of the axle and directly against the outer face of a sleeve-turning washer, 12, which fits onto the outer end of the sleeve 6, said outer end of the latter having flattened surfaces on opposite sides thereof, as shown, whereby said sleeve may be turned by turning said washer for the purpose below described.

The lower end, 13, of each of the ends of the rear fork is suitably perforated to pass over and be held on the flattened end of said sleeve 6 behind said washer 12, as shown in Fig. 1, the inner side of said fork having a bearing against the outer end of the collar 8, and the outer side of said fork end and the adjoining inner side of the washer 12 have interlocking shouldered bearings, as shown. Thus by screwing the nut 4 against the outer side of the washer 12 the latter and the end of the fork are rigidly locked against the end of the collar 8, and the latter is thereby rigidly held against any rotary motion that might be induced by the said rolling action of the bearing-balls thereagainst.

By reference to Fig. 1 it is seen that the interior of the end of the hub 3 has formed therein an annular groove, 14, having an operative position or relation to the said annular groove between the adjacent inner ends of the said bearing-collars 7 and 8, so that by means of the said two annular grooves opposite each other there is formed a suitable channel within which to place the series of bearing-balls 9, as shown in said last-named figure, on which the hub 3 bears and rotates.

In Fig. 2, *a* indicates that portion of the end of the hub 3 within which the said bearing-collars are received, and at one point in the border of the opening *a* in the end of the hub a groove or slot, *c*, is formed, through which the bearing-balls 9 are passed to place them in the said annular groove 14 within the hub. The said bearing-collars 7 and 8 are normally adjusted to and held in the position shown in Fig. 1 for operation with the hub 3 and the interposed bearing-balls 9; but after the portions of said collars on which said balls bear and rotate have become worn away to a certain degree the collars are adjusted to take up said wear by first loosening or taking off the locking-nut 4 from the axle and then rotating the turning washer to draw said bearing-collars toward each other until the bearing shall be again properly adjusted. The said washer may be turned by a spanner applied to suitable holes in its face, or by other suitable means, and after said adjustment of the bearing the locking-nut is replaced on the end of the axle, as before. The said sleeve, if made with a continuous screw instead of right and left hand ones, serves to adjust said collars by holding the collar 8 while turning the sleeve, thereby drawing collar 7 toward the balls 9, and then screwing collar 8 toward the opposite side of the balls, while holding the sleeve so that the latter cannot turn.

What I claim as my invention is—

1. In an improved ball-bearing, the combination, with the legs of the fork and the axle non-rotatable thereon, of two normally-separated and movable bearing-collars on the axle having a ball-groove in and between their adjacent separated ends, a rotatable adjusting-sleeve interposed between said collars and axle having a screw engagement with said collars, a wheel-hub receiving therein said bearing-collars, having an annular ball-groove therein, and bearing-balls between said hub and collars, substantially as described.

2. An improved ball-bearing consisting of the combination, with an axle, substantially as described, of two normally-separated but movable bearing-collars carried on the axle having a ball-groove in and between their adjacent separated ends, one of said collars having an engagement with said axle, a rotatable adjusting-sleeve interposed between said collars and axle having a screw-connection with said collars, whereby they are approached and separated, a wheel-hub receiving therein said bearing-collars having an annular ball-groove therein, and bearing-balls between said hub and collars, substantially as set forth.

3. An improved ball-bearing consisting of the combination, with an axle, of two normally-separated but movable bearing-collars carried on the axle having a ball-groove in and between their separated ends, one of said collars having an engagement with said axle, a rotatable adjusting-sleeve interposed between said collars and axle having a screw-connection with said collars, whereby they are approached and separated, a turning washer applied to the outer end of said sleeve, a wheel-hub receiving therein, said bearing-collars having an annular ball-groove therein, and bearing-balls between said hub and collars, substantially as set forth.

4. In combination, the wheel-hub 3, having therein an annular ball-groove, the axle 2, having a projecting pin or pins, 5, the exteriorly-screw-threaded sleeve 6, rotatable on said axle, the normally-separated bearing-collars 7 and 8 on said sleeve having a screw engagement therewith and a ball-groove in their separated ends, said collar 7 having a slotted engagement with said pins 5 in the axle, a turning washer, 12, engaging with the end of said sleeve, bearing-balls between said hub and collars, and a locking-nut, 4, screwed on the end of said axle, substantially as set forth.

GEO. T. WARWICK.

Witnesses:
G. M. CHAMBERLAIN,
H. A. CHAPIN.